Patented Dec. 1, 1925.

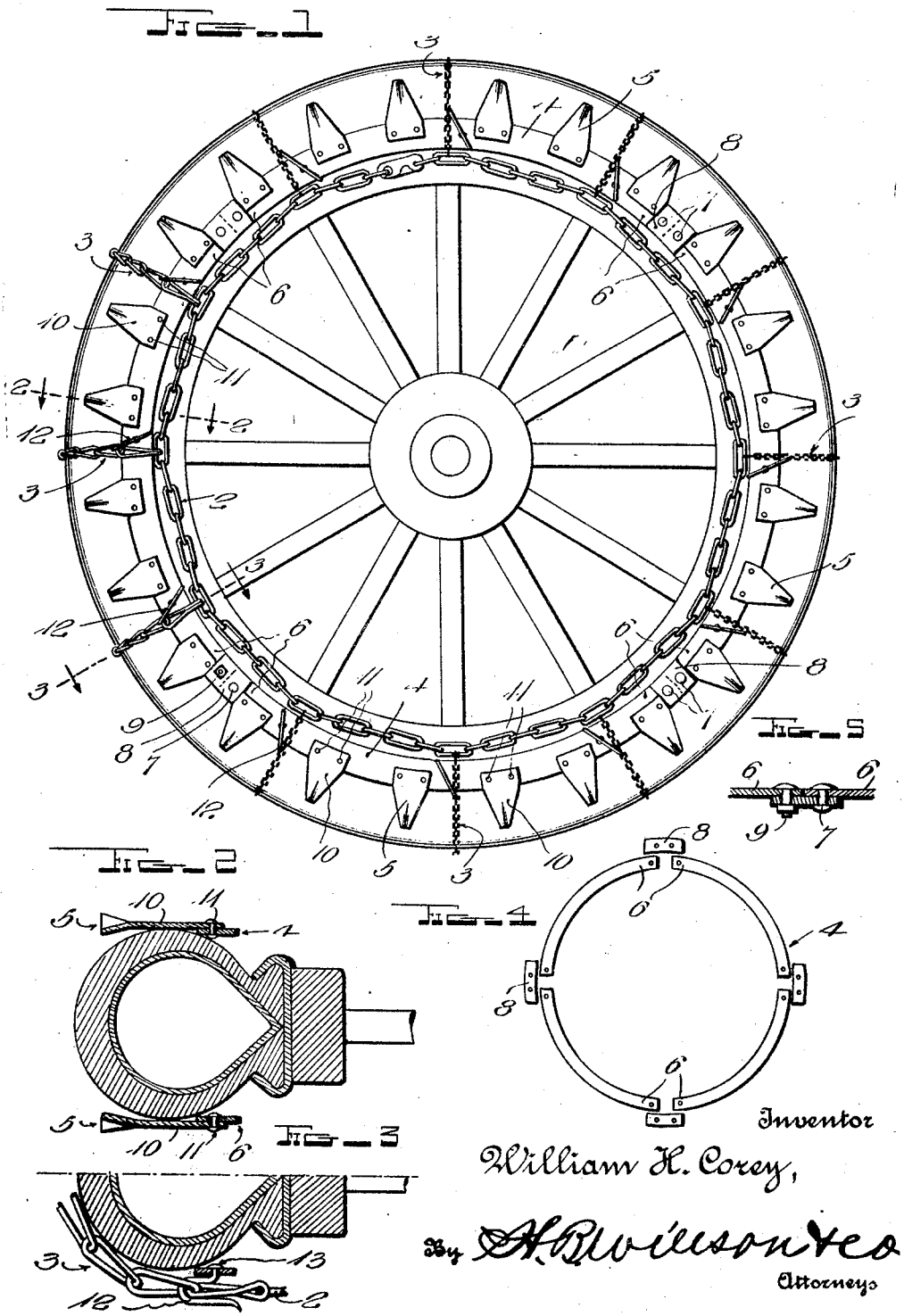

1,563,689

UNITED STATES PATENT OFFICE.

WILLIAM HENRY COREY, OF NEWPORT, MAINE.

NONSKID DEVICE.

Application filed April 6, 1925. Serial No. 21,107.

*To all whom it may concern:*

Be it known that I, WILLIAM H. COREY, a citizen of the United States, residing at Newport, in the county of Penobscot and State of Maine, have invented certain new and useful Improvements in Nonskid Devices; and I do declare the following to be a full, clear, and exact description of the invention, such as will enable others skilled in the art to which it appertains to make and use the same.

My invention aims to provide a simple and inexpensive, yet an easily applied, reliable and efficient device to prevent skidding of motor vehicles, the device being of a construction to co-operate with and to be secured in place by an ordinary tire chain.

With the foregoing in view, the invention resides in the novel subject matter hereinafter described and claimed, the description being supplemented by the accompanying drawing.

Figure 1 is a side elevation showing the application of my invention.

Figures 2 and 3 are transverse sectional views on lines 2—2 and 3—3 of Fig. 1.

Figure 4 is a disassembled elevation of one of the rings which carry non-skid spurs or prongs.

Figure 5 is a detail sectional view showing the preferred joint between adjacent ends of the ring sections.

In the drawing above briefly described, a common type of tire chain is disclosed, including two side chains designated by the numerals 2, and cross chains 3. To co-operate with the tire chain in giving effective traction and preventing skidding, I provide either one or two annular members, two being preferably provided for disposition at opposite sides of a tire. Each of these annular members comprises a ring 4 having appropriate projecting prongs or spurs 5. The ring for location at the outer side of the tire may be of a continuous one-piece formation if desired, but the inside ring must be split at one or more points, in order that it may be passed around the axle of the machine. In the present disclosure, each ring may be considered as formed of a plurality of sections 6. Riveted at 7 to one end of each of these sections, I have shown a plate 8 which is adapted to be secured by a bolt 9 to the adjacent end of the next section. This particular joint however need not necessarily be used as any equivalent could well be employed.

In forming the spurs or prongs 5, metal plates are preferably stamped into pointed form and corrugated as at 10 at their outer ends, the inner ends of these plates being riveted or otherwise secured as at 11, to the rings 4.

When the rings 4 are engaged with opposite sides of a tire and the usual tire chain is applied around the tire and rings, said chain effectively holds both rings in position and it will be obvious that the pronged rings co-operate with the chains in effectively preventing skidding as well as assuring excellent traction. When applied in this manner, it will be seen that the rings are crossed by the end portions of the cross chains 3, so that they are effectively held in place. Moreover, attention may be directed to the fact that the rings are free to float to quite an extent with flexure of the tire chain, insuring at all times that the prongs shall properly engage the roadway.

In the present disclosure, each ring 4 is provided with a plurality of circumferentially spaced hooks 12 to be engaged with links of the cross chains 3, but in all instances, these hooks need not be used. When they are employed, they are preferably pivoted to the rings 4, for instance, by passing them through openings in said rings and upsetting their inner ends, as indicated at 13 in Fig. 3. By pivoting the hooks to the rings, they can be more readily engaged with the links of the tire chain, than would otherwise be possible. By providing the rings with hooks or the like, it is also possible in some instances to use them at the outer side of the tire chain, if desired, but it is in a great majority of cases preferable to have the rings surrounded by the chain. It may further be stated that while two rings are preferably employed in connection with each tire chain, one might suffice in some instances.

It will be seen from the foregoing that a simple and inexpensive non-skid device has been provided, yet one which will be highly efficient and desirable, and as excellent results have been obtained from the details disclosed, they are preferably followed. However, within the scope of the invention as claimed, modifications may of course be made.

I claim:

1. Anti-skidding means comprising a tire chain of the type embodying two side chains connected at intervals by cross chains, a ring at the inner side of the tire chain and crossed by end portions of the cross chains to be held against one side of a tire by said cross chains, and prongs projecting from said ring between said cross chains.

2. Anti-skidding means comprising a tire chain of the type embodying two side chains connected at intervals by cross chains, a ring at the inner side of the tire chain and crossed by end portions of the cross chains, hooks pivotally connected to said ring and engaged with the links of said cross chains, and prongs projecting from said ring.

3. Anti-skidding means comprising a ring having projecting prongs, and means for connecting said ring to a tire chain consisting of side and cross chains to be held by said chain at one side of a tire.

4. A structure as specified in claim 3; said connecting means comprising pivoted hooks on the ring to engage links of the tire chain.

In testimony whereof I have hereunto affixed my signature.

WILLIAM HENRY COREY.